US012187901B2

(12) United States Patent
Delst et al.

(10) Patent No.: US 12,187,901 B2
(45) Date of Patent: Jan. 7, 2025

(54) COMPOSITION INCLUDING REFLECTIVE PARTICLES

(71) Applicant: VIAVI SOLUTIONS INC., San Jose, CA (US)

(72) Inventors: Cornelis Jan Delst, Fairfax, CA (US); Paul Thomas Kohlmann, Windsor, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 872 days.

(21) Appl. No.: 16/455,317

(22) Filed: Jun. 27, 2019

(65) Prior Publication Data

US 2020/0002542 A1 Jan. 2, 2020

Related U.S. Application Data

(60) Provisional application No. 62/692,394, filed on Jun. 29, 2018.

(51) Int. Cl.
| | | |
|---|---|---|
| *C09C 1/00* | (2006.01) | |
| *C09D 5/33* | (2006.01) | |
| *C09D 11/00* | (2014.01) | |
| *C09D 17/00* | (2006.01) | |
| *H01F 1/28* | (2006.01) | |

(52) U.S. Cl.
CPC ............ *C09C 1/0081* (2013.01); *C09D 5/004* (2013.01); *C09D 11/00* (2013.01); *C09D 17/00* (2013.01); *H01F 1/28* (2013.01); *C01P 2006/42* (2013.01); *C01P 2006/60* (2013.01)

(58) Field of Classification Search
None
See application file for complete search history.

(56) References Cited

U.S. PATENT DOCUMENTS

| 4,838,648 A | 6/1989 | Phillips et al. |
| 6,134,863 A * | 10/2000 | Knox ............... C09C 1/648 53/434 |
| 6,294,010 B1 | 9/2001 | Pfaff et al. |
| 6,524,381 B1 | 2/2003 | Phillips et al. |
| 8,511,712 B2 | 8/2013 | Raksha et al. |
| 2003/0017355 A1 | 1/2003 | Wang et al. |

(Continued)

FOREIGN PATENT DOCUMENTS

| EP | 1335955 B1 | 7/2009 |
| EP | 2531562 B1 | 1/2018 |

(Continued)

OTHER PUBLICATIONS

International Search Report and Written Opinion dated Sep. 19, 2019 issued on PCT Patent Application No. PCT/US2019/039583 dated Jun. 27, 2019, Federal Institute of Industrial Property, Moscow, Russia.

*Primary Examiner* — Ronak C Patel
(74) *Attorney, Agent, or Firm* — Mannava & Kang, P.C.

(57) ABSTRACT

A composition includes magnetic particles having a median particle size ranging from about 10 to about 30 microns; and reflective particles having a median particle size ranging from about 1 to about 9 microns, wherein the reflective particles have a lightness at least 10 points higher than the lightness of the magnetic particles. A method of making the composition is also disclosed.

20 Claims, 1 Drawing Sheet

(56) References Cited

U.S. PATENT DOCUMENTS

| | | | | |
|---|---|---|---|---|
| 2004/0028905 A1* | 2/2004 | Phillips | ............... | B42D 25/369 |
| | | | | 428/404 |
| 2010/0098921 A1* | 4/2010 | Burrows | .............. | C09D 11/322 |
| | | | | 428/206 |
| 2010/0178508 A1* | 7/2010 | Kasch | .................... | C09K 19/38 |
| | | | | 427/492 |
| 2016/0032531 A1 | 2/2016 | Husband | | |
| 2016/0176223 A1* | 6/2016 | Degott | ..................... | C09D 5/36 |
| | | | | 427/595 |

FOREIGN PATENT DOCUMENTS

| | | |
|---|---|---|
| JP | 2000-198945 | 7/2000 |
| JP | 2003-073620 | 3/2003 |
| JP | 2005281062 A | 10/2005 |
| JP | 2009536974 A | 10/2009 |
| JP | 2012-061451 | 3/2012 |
| RU | 2553019 C2 | 6/2015 |
| WO | 1999027185 A1 | 6/1999 |
| WO | 2003022934 A1 | 3/2003 |
| WO | 2010/115986 A2 | 10/2010 |
| WO | 2015/018663 A1 | 2/2015 |

\* cited by examiner

100

COMPOSITION INCLUDING REFLECTIVE PARTICLES

RELATED APPLICATION

The present application claims priority to U.S. Provisional Application No. 62/692,394, filed Jun. 29, 2018, the entire disclosure of which is hereby incorporated by reference.

FIELD OF THE INVENTION

The present disclosure generally relates to compositions including articles, in the form of flakes, in which the articles can modify the color of a pigment base by adjusting the lightness of the base. The composition can include magnetic particles having a median particle size from about 10 to about 30 microns; and reflective particles having a median particle size ranging from about 1 to about 9 microns. Methods of making the composition are also disclosed.

BACKGROUND OF THE INVENTION

Colored or color shifting magnetic pigments based on optical interference are typically utilized to provide instant identification and authenticity to a document. As such, the customer is usually highly concerned that the color meets particular color specifications. For example, a customer selectable color can have a particular shade, hue and color value. A customer selectable color can be a composition found in registered proprietary colors, such as used, for example, in corporate logos, authorized letterhead, and official seals. The color properties of the composition, such as an ink, varnish, coating, or paint, can be formulated to include all hue angles, by adjusting the thickness of dielectric layers in the pigment but some hue angles made with optical interference effects, though highly chromatic, are less attractive to the human eye due to a lower lightness.

Previously, the less attractive hue angles, ones with a lower lightness, were resolved by adjusting a thickness of an absorber layer or by adding a magnetic reflective pigment without an absorber layer that increased lightness. The adjusted absorber layer complicated the production process and made the product less stable because a thin absorber layer was less easy to control and were impacted by oxidation. The addition of a magnetic reflective pigment without an absorber layer introduced a grainy and sparkling effect that is not attractive in certain applications.

SUMMARY OF THE INVENTION

In an aspect, there is disclosed a composition including magnetic particles having a median particle size ranging from about 10 to about 30 microns; and reflective particles having a median particle size ranging from about 1 to about 9 microns wherein the reflective particles have a lightness at least 10 points higher than the lightness of the magnetic particles.

In another aspect, there is disclosed a method for making a composition including providing magnetic particles having a median particle size ranging from about 10 to about 30 microns; providing reflective particles having a median particle size ranging from about 1 to about 9 microns; and blending, in a liquid medium, the magnetic particles with the reflective particles to form a composition.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1:
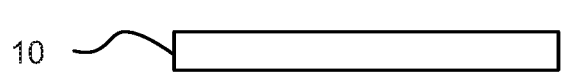
FIG. 1 is a cross-sectional view of a reflective particle according to an aspect of the present disclosure.

It is to be understood that both the foregoing general description and the following detailed description are exemplary and explanatory only, and are intended to provide an explanation of various embodiments of the present teachings. In its broad and varied embodiments, disclosed herein are compositions including articles, for example, in the form of foils, sheets, and flakes; and a method of manufacturing the composition. In an example, the articles such as pigments, optical taggants, and optical security devices can be manufactured with a simplified construction.

A composition can include magnetic particles having a median particle size ranging from about 10 to about 30 microns; and magnetic or non-magnetic reflective particles having a median particle size from about 1 to about 9 microns, wherein the reflective particles have a lightness at least 10 points higher than the lightness of the magnetic particles.

The inclusion of the non-magnetic reflective particles having a smaller median particle size than the magnetic particles can reduce the optically variable effect of the reflective particles in the composition. In particular, the reflective particles, such as in the form of a flake, are less likely to align parallel to the magnetic colored or color shifting particles. The reflective particles can include a median particle size with a reflected energy for the individual particles that is not visible to the naked eye and can allow adjustment of lightness of a base color, such as provided by the magnetic particles, based upon the needs of a specific color/application/feature. The reflective particles allow for adjustment of lightness and/or hue angle with a reduced graininess (sparkle) effect as compared to reflective particles having a median particle size greater than 9.5 microns. The population of reflective particles with a smaller median particle size needs to have a tight enough size range to not compose a significant number of flakes that result in visible graininess or sparkle. A common way to define the size range on the high end of the range is by specifying the D90, where 90% of the particles have a size that is smaller than this D90 value. This invention assumes a D90 of the reflective particles that is small enough to not result in clearly visible graininess. It should be clear that the use or addition of a small particle size reflective pigment does not reduce the graininess or sparkle of the pigment that it is added to. The invention is to increase lightness of a magnetic pigment blend without increasing clearly visible graininess and or sparkle under normal lighting conditions.

The reflective particles have a lightness (L* CIELAB 1976) that is, when measured in mass-tone, at least 10 points higher than the lightness of the magnetic particles, which can be colored or color shifting, in the composition. For example, if the composition has magnetic particles have a lightness of 5, then the reflective particles have a lightness of 15. In an aspect, the reflective particles have a lightness (L*) of at least 12 points higher than the lightness of the magnetic particles, for example at least 15 points higher, and as a further example at least 20 points higher. One of ordinary skill in the art would be able to calculate the lightness (L*) using known techniques. The reflective particles can be colorless or weakly colored or color shifting, have both a* and b* CIELAB 1976 under 20 when measured in mass-tone, or be colored or color shifting. Mass-tone in this context is a drawdown method in a liquid coating, paint or ink, that is appropriate for the material, with a pigment hiding that exceeds or approaches 100%.

The median particle size can be determined by the particle size distribution (D50), also known as the median diameter or the medium value of the particle size distribution, and is the value of the particle diameter at 50% in the cumulative distribution. For example, if D50=10 micron, then 50% of the particles in the sample are larger than 10 microns, and 50% of the particles in the sample are smaller than 10 microns. When referring to median particle size or D50 in the context of this document, diameter is the diameter of a circular or spherical particle with an equivalent projected surface area. Reflective pigment particles do not, in general, have a circular shape. The reflective particles can be shaped as random shape platelets.

Particles, such as pigments, that are manufactured to a particle size by either wet or dry grinding can generally have a normal distribution around a D50 median particle size. It is highly likely that graininess or sparkle caused by reflective particles in a blend is mostly caused by the particles that are in the high end of the size distribution, i.e., that have a particle size that is greater than the median size. It would be advantageous to remove this high end of the particle size distribution to reduce graininess, but sieving and other classification processes are complicated on a production scale. It is much easier to reduce the D50 to a level where the population of larger particles that will cause graininess or sparkle is sufficiently small. Particles that are highly reflective can show up as bright spots with extremely strong illumination. The visibility of these particles is not determined by angular or spatial resolution of the human eye. The visibility is determined by the lightness contrast between the specular reflection of the reflective particle and the surrounding particles, such as the colored or color shifting magnetic particles or voids between these particles. With a high enough light level, even the smallest particle, larger than the wavelength of light, can cause graininess or sparkle. The reflective particles have a median particle size small enough to not have the contrast with the surrounding magnetic particle thereby resulting in graininess or sparkle under normal lighting conditions. Light levels well over 100,000 lux (more than bright outdoor sunlight) or extremely directional lighting conditions are considered outside the range to be addressed by the invention.

The composition can also include a liquid medium. The liquid medium can include various polymeric compositions or organic binders such as, acrylic melamine, urethanes, polyesters, vinyl resins, acrylates, methyl methacrylate, ABS resins, epoxies, styrenes, mixtures thereof, as well as others well known to those skilled in the art, such as ink, coating, and paint formulations, for example those based on alkyd resins. The composition can be in the form of a paint, an ink, a coating, a varnish, a colorant composition, etc.

The composition can include magnetic particles having a median particle size ranging from about 10 to about 30 microns. The magnetic particles can be colored or color shifting. Particles produce light scatter at the edges of the particles, which makes a small particle size for the colored or color shifting pigment less desirable as this can degrade the color performance. The magnetic particles can have a median particle size ranging from about 11 to about 20 microns, for example from about 13 to about 18 microns. It will be appreciated that the median particle size of the magnetic particles can be a median particle size of all of the magnetic particles in the composition. Additionally, it will be appreciated that any number within the disclosed ranges can be the particle size, such as the median particle size, of the magnetic particles.

The magnetic particles can include at least one layer of a reflector layer, a dielectric layer, and an absorber layer. In an aspect, the magnetic particles can include at least one layer that is a reflector layer having a high reflectance and magnetic properties. In another aspect, the magnetic particles can include at least one layer including a magnetic layer that is different than the reflector layer. The magnetic particles can also include a colored material. The magnetic particles can be aligned in a magnetic field.

The reflector layer for use in the magnetic particle can be a wideband reflector, e.g., Lambertian reflector (e.g., white $TiO_2$) but is typically a specular reflector. A Lambertian reflector would dilute the optically variable effect of a specular magnetic color shifting pigment. The reflector layer can include metals, non-metals, and/or metal alloys. The terms "metallic" or "metallic layer" used herein, unless otherwise stated, are intended to include all metals, metal alloys, pure metal or metal alloy containing materials, compound, compositions, and/or layers.

In an example, the materials for the reflector layer can include any materials that have reflective characteristics in the desired spectral range. For example, any material with a reflectance ranging from 5% to 100% in the desired spectral range. An example of a reflective material can be aluminum, which has good reflectance characteristics, is inexpensive, and easy to form into or deposit as a thin layer.

Other materials can also be used in place of aluminum. For example, copper, silver, gold, platinum, titanium, palladium, nickel, cobalt, niobium, chromium, tin, and combinations or alloys of these or other metals can be used as reflective materials. In an aspect, the material for the reflector layer can be a white or light colored metal. In other aspects, the reflector layer can include, but is not limited to, the transition and lanthanide metals and combinations thereof; as well as metal carbides, metal oxides, metal nitrides, metal sulfides, a combination thereof, or mixtures of metals and one or more of these materials.

The thickness of the reflector layer can range from about 5 nm to about 5000 nm, although this range should not be taken as restrictive. For example, a reflector layer including aluminum with a minimum optical density (OD) can be from about 0.1 to about 4 at a wavelength of about 550 nm.

In order to obtain a sufficient optical density and/or achieve a desired effect, a higher or lower minimum thicknesses can be required depending upon the composition of the reflector layer. In some examples, the upper limit can be about 5000 nm, about 4000 nm, about 3000 nm, about 1500 nm, about 200 nm, and/or about 100 nm. In one aspect, the thickness of the reflector layer can range from about 10 nm to about 5000 nm for example, from about 15 nm to about 4000 nm, from about 20 nm to about 3000 nm, from about 25 nm to about 2000 nm, from about 30 nm to about 1000 nm, from about 40 nm to about 750 nm, or from about 50 nm to about 500 nm, such as from about 60 nm to about 250 nm or from about 70 nm to about 200 nm.

The dielectric layer can be external to the reflector layer in the magnetic particles. The dielectric layer can, typically, serve as a transparent spacer layer, and can provide durability and rigidity. The dielectric layer can be formed of any transparent dielectric material having a low refractive index, i.e. a refractive index of less than about 1.65, or a high refractive index, i.e. a refractive index of greater than about 1.65. Suitable dielectric materials having a low refractive index include, but are not limited to, silicon dioxide ($SiO_2$), aluminum oxide ($Al_2O_3$), and metal fluorides, such as magnesium fluoride ($MgF_2$). Suitable dielectric materials having a high refractive index include, but are not limited to, silicon monoxide (SiO) and zinc sulfide (ZnS). In an aspect, the dielectric layer can include magnesium fluoride.

The dielectric layer, if more than one dielectric layer is present, can each independently be formed of the same or different dielectric materials and can have the same or different physical thicknesses. For example, one or more dielectric layers can be formed of the same dielectric material, but can have different physical thicknesses and, therefore, different optical thicknesses. Generally, the dielectric layer can each independently have a physical thickness of about 100 nm to about 1000 nm. The physical thickness can be selected to correspond with an optical thickness required by a layer structure for providing a desired optical effect.

The absorber layer can be external to the dielectric layer in the magnetic particles. The absorber layer can include metals, non-metals, or metal alloys. In one example, the material for the absorber layer can include any absorber material, including both selective absorbing materials and nonselective absorbing materials. For example, the absorber layer can be formed of nonselective absorbing metallic materials deposited to a thickness at which the layer is at least partially absorbing, or semi-opaque.

An example of a non-selective absorbing material can be a gray metal, such as chromium or nickel. An example of a selective absorbing material can be copper or gold. In an aspect, the absorbing material can be chromium. Non-limiting examples of suitable absorber materials include metallic absorbers such as chromium, aluminum, silver, nickel, palladium, platinum, titanium, vanadium, cobalt, iron, tin, tungsten, molybdenum, rhodium, niobium, copper, as well as other absorbers such as carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials that can be used to form the absorber layer.

Examples of suitable alloys of the above absorber materials can include Inconel (Ni—Cr—Fe), stainless steels, Hastalloys (Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. Other examples of suitable compounds for the absorber layer include titanium-based compounds such as titanium silicide (TiSi2), titanium boride (TiB2), and combinations thereof. Alternatively, the absorber layer can be composed of a titanium-based alloy disposed in a matrix of Ti, or can be composed of Ti disposed in a matrix of a titanium-based alloy.

The absorber layer can also be formed of a magnetic material, such as a cobalt nickel alloy. This can simplify the manufacture of a magnetic color shifting device or structure by reducing the number of materials required.

The absorber layer can be formed to have a physical thickness in the range from about 1 nm to about 50 nm, such as from about 5 nm to about 10 nm, depending upon the optical constants of the absorber layer material.

A reflector layer can be external to a magnetic layer in the magnetic particles. The magnetic layer can include magnetic permeable, magnetic orientable materials, magnetic materials, and combinations thereof. A magnetic material, such as ferromagnetic and ferrimagnetic materials, includes but is not limited to, nickel, cobalt, iron, gadolinium, terbium, dysprosium, erbium, and their alloys or oxides. For example, a cobalt nickel alloy can be employed, with the cobalt and nickel having a ratio by weight of about 80% and about 20%, respectively. This ratio for each of these metals in the cobalt nickel alloy can be varied by plus or minus about 10%. Other examples of alloys include, but are not limited to, Fe/Si, Fe/Ni, Fe/Co, Fe/Ni/Mo, Fe/Cr, Ni/Cr, and combinations thereof. In an aspect, the magnetic layer can include a polymer containing iron oxide particles. Hard magnets of the type $SmCo_5$, $NdCo_5$, $Sm_2CO_{17}$, $Nd_2Fe_{14}B$, $Sr_6Fe_2O_3$, $TbFe_2$, Al—Ni—Co, and combinations thereof, can also be used as well as spinel ferrites of the type $Fe_{3O4}$, $NiFe_{2O4}$, $MnFe_{2O4}$, $CoFe_{2O4}$, or garnets of the type YIG or GdIG, and combinations thereof. In an aspect, the magnetic material may be ferritic stainless steel. The magnetic material can be selected for its reflecting or absorbing properties as well as its magnetic properties. The magnetic layer can be formed by a material having magnetic and non-magnetic particles, or magnetic particle within non-magnetic medium, for example cobalt-doped zinc oxide film.

Although this broad range of magnetic materials can be used, "soft" magnets can be used in an aspect. As used herein, the term "soft magnets" refers to any material exhibiting ferromagnetic properties but having a remanance that is substantially zero after exposure to a magnetic force. Soft magnets can show a quick response to an applied magnetic field, but have very low (coercive fields (Hc) =0.05-300 Oersted (Oe)) or zero magnetic signatures, or retain very low magnetic lines of force after the magnetic field is removed.

Similarly, as used herein, the term "hard magnets" (also called permanent magnets) refers to any material that exhibits ferromagnetic properties and that has a long lasting remanance after exposure to a magnetizing force. A ferromagnetic material is any material that has permeability substantially greater than 1 and that exhibits magnetic hysteresis properties. In an aspect, any magnetic material can be used in the magnetic layer so long as the material enables the orienting of the magnetic particles in a magnetic field.

The magnetic layer can have a thickness ranging from about 10 nm to about 1500 nm, for example from about 35 nm to about 45 nm, and as a further example from about 40 nm. The magnetic layer can be deposited to a thickness so that it is substantially opaque. In an aspect, the magnetic layer can be deposited to a thickness so that it is not substantially opaque.

The composition can include magnetic particles including a magnetic layer, a reflector layer external to the magnetic layer, a dielectric layer external to the reflector layer, and an absorber layer external to the dielectric layer. The magnetic particles can be present in the composition in an amount ranging from about 1 wt. % to about 35 wt. %, for example from about 5 wt. % to about 30 wt. %, and as a further example, from about 10 wt. % to about 25 wt. %, based upon the total weight of the composition. The composition can also include reflective particles. The reflective particles can be present in the composition in an amount from about 1 to about 40 area percent, based upon the combined particle surface of the magnetic particles and the reflective particles. The reflective particles can be present in the composition in an amount from about 1 to about 30 area percent, based upon the combined particle surface of the magnetic particles and the reflective particles.

The reflective particles can have a median particle size ranging from about 1 to about 9 microns. In an aspect, the reflective particles can have a median particle size ranging from about 1 to about 7 microns. It will be appreciated that the particle size of the reflective particles can be an average or median particle size of the all of the reflective particles in the composition. Additionally, it will be appreciated that any number within the disclosed ranges can be the particle size, such as the average or median particle size, of the reflective particles.

As illustrated in FIG. 1, the reflective particles 100 can include a reflector layer 10 having a high reflectance and magnetic properties. The reflector layer can be a single layer of a single material. For example, the reflector layer 10 can include any material common to both the reflector layer and magnetic layer disclosed above with regard to the magnetic particles. For example, the reflective particle can include a reflector layer 10 of nickel, which has a high reflectance and magnetic properties.

Figure 2:
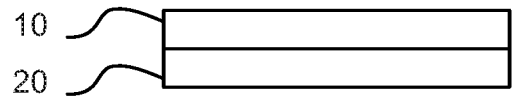
FIG. 2 is a cross-sectional view of a reflective particle according to an aspect of the present disclosure.

As illustrated in FIG. 2, the reflective particles 100 can include a reflector layer 10 and a magnetic layer 20. In an aspect, the reflector layer 10 can be external to the magnetic layer 20. The materials for use in each of the reflector layer 10 and the magnetic layer 20 can be any of those disclosed above with regard to the reflector layer and magnetic layer for the magnetic particles.

Figure 3:
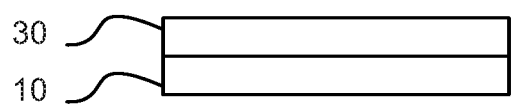
FIG. 3 is a cross-sectional view of a reflective particle according to an aspect of the present disclosure.

As illustrated in FIG. 3, the reflective particles 100 can include a reflector layer 10 having high reflectance and magnetic properties, and a dielectric layer 30. The dielectric layer 30 can be external to the reflector layer 10. The reflector layer can include any material common to both the reflector layer and the magnetic layer disclosed above with regard to the magnetic particles. The material for use in the dielectric layer 30 can be any of those disclosed above with regard to the dielectric layer for the magnetic particles.

Figure 4:
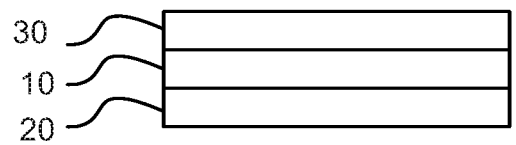
FIG. 4 is a cross-sectional view of a reflective particle according to an aspect of the present disclosure.

As illustrated in FIG. 4, the reflective particles 100 can include a reflector layer 10, a magnetic layer 20, and a dielectric layer 30. The reflector layer 10 can be external to the magnetic layer 20, and the dielectric layer 30 can be external layer to the reflector layer 10. The material for use in the magnetic layer 20, the reflector layer 10, and the dielectric layer 30 can be any of those disclosed above with regard to the magnetic layer, reflector layer, and dielectric layer for the magnetic particles.

In an aspect, the reflective particles for use in the composition do not include an absorber layer.

Figure 5:
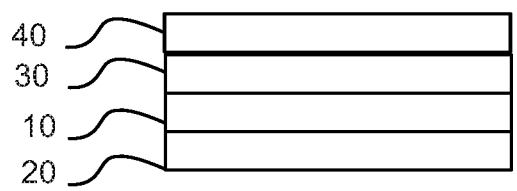
FIG. 5 is a cross-sectional view of a reflective particle according to another aspect of the present disclosure.

As illustrated in FIG. 5, the reflective particles 100 can include a reflector layer 10, a magnetic layer 20, a dielectric layer 30, and optionally an absorber layer 40. The reflector layer 10 can be external to the magnetic layer 20, and the dielectric layer 30 can be external layer to the reflector layer 10. The absorber layer 40 can be external to the dielectric layer 30. The reflective particles 100 can also include a second absorber layer (not shown) that is external to a second dielectric layer (not shown), which can be external to the magnetic layer 20. The material for use in the magnetic layer 20, the reflector layer 10, the dielectric layer 30, and the optional absorber layer 40 can be any of those disclosed above with regard to the magnetic layer, reflector layer, dielectric layer, and absorber layer for the magnetic particles.

A method of making the composition disclosed herein, can include providing magnetic particles having a median particle size ranging from about 10 to about 30 microns; providing reflective particles 100 having a median particle size ranging from about 1 to about 9 microns; and blending, in a liquid medium, the magnetic particles with the reflective particles to from the composition. The reflective particles can have a lightness at least 10 points higher than the lightness of the magnetic particles. The reflective particles 100 can include any of the structures illustrated in FIGS. 1-4. In an aspect, the reflective particles 100 can include a reflector layer 10 having a high reflectance and magnetic properties. In another aspect, the reflective particles 100 can include a reflector layer 10 and a magnetic layer 20. In another aspect, the reflective particles 100 can include a reflector layer 10 having a high reflectance and magnetic properties, and a dielectric layer 30. In a further aspect, the reflective particles 100 can include a magnetic layer 20, a reflector layer 10, and a dielectric layer 30, and optionally an absorber layer 40.

The magnetic particles can be formed by depositing on a substrate a magnetic layer. A reflector layer can be deposited on the magnetic layer. A dielectric layer can be deposited on the reflector layer. An absorber layer can be deposited on the dielectric layer.

The reflective particles 100 can be formed by depositing on a substrate a reflector layer 10. In another aspect, the reflective particles 100 can be formed by depositing on a substrate a magnetic layer 20. A reflector layer 10 can be deposited on the magnetic layer 20. In another aspect, the reflective particles 100 can be formed by depositing on a substrate a reflector layer 10. A dielectric layer 30 can be deposited on the reflector layer 10. In a further aspect, the reflective particles 100 can be formed by depositing on a substrate a magnetic layer 20. A reflector layer 10 can be deposited on the magnetic layer 20. A dielectric layer 30 can be deposited on the reflector layer 10.

A violet to bronze type interference pigment (magnetic particle) with a 12 micron D50 particle size was made. This particle size was determined with a Malvern 2000 optical particle size analyzer, compensated for a non-spherical particle shape. The layer structure of this pigment was: absorber/dielectric/reflector/magnetic core/reflector/dielectric/absorber. The absorber layers were each independently, chromium, vacuum coated to a light transmission of 40% at 540 nm light wavelength. The dielectric layers were each independently Magnesium Difluoride, vacuum coated to a physical thickness of an average 290 nanometers. The reflector layers were each independently Aluminum coated to an optical density of 1.5 or more. The magnetic core layer was a blend of Iron and Chromium in a ratio approximately 90 to 10 percent by weight and a layer thickness estimated at 40 nanometers. This pigment had a dark, saturated, violet color when observed at a close to perpendicular viewing angle. This color shifted to a deep bronze at higher viewing angles.

This pigment was used for three screen ink samples. Sample one was 15% by weight of the pigment and 85% Flint ink UVF00061. For sample two, ⅓ of the violet to bronze interference pigment weight was replaced by a similar pigment without the absorber layers and a D50 particle size of 12 microns, determined with a Malvern 2000 optical particle size analyzer, compensated for a non-spherical particle shape. For sample three, ⅓ of the violet to bronze interference pigment weight was replaced by a similar pigment (reflective particle) without the absorber layers and a D50 particle size of 5.5 micron, determined with a Malvern 2000 optical particle size analyzer, compensated for a non-spherical particle shape. The reflective particles in sample three had a lightness (L*) in the range of 55 in mass tone.

Three printed samples were made with 200 mesh silk screen using a manual flat-bed press. The substrate was the black area of a Leneta draw down card (Form 2A-H opacity, Lenata Company). Before and while the ink was cured, the magnetic flakes in the ink were aligned parallel to the ink surface with a rotating bar magnet under the substrate, an identical procedure was used for each sample.

Results—As expected, the addition of the reflective pigment increased the lightness of the samples with a reduction of color saturation. Sample two and three showed equivalent lightness. Sample three was, to the naked eye, much less grainy and showed much less sparkle than sample two.

Lightness—The lightness, measured with a Datacolor DC650 spectrophotometer, of sample one was 36.41, the lightness of sample two was 43.85, and the lightness of sample three was 44.72.

Graininess—Graininess of these samples was measured with a BYK-mac 23 mm aperture CM-6362 instrument. In order to reduce the influence of alignment directionality of the flake alignment, all measurements with this instrument were made at 0 and 90, 180 and 270 degrees relative to the printed sample orientation (as in landscape, portrait, each in both directions), and averaged for these four orientations. Sample one measured an average graininess of 2.4, sample two measured an average graininess of 8.05, and sample three measured an average graininess of 4.57.

Sparkle—Sparkle grade at 15° of these samples was measured with a BYK-mac 23 mm aperture CM-6362 instrument. In order to reduce the influence of alignment directionality of the flake alignment, measurements were made at 0 and 90, 180 and 270 degrees relative to the printed sample orientation (as in landscape, portrait, each in both directions), and averaged for these four orientations. Sample one measured an average sparkle grade of 2.75, and sample three measured an average sparkle grade of 4.16.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each composition, device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a composition and its many aspects, features and elements. Such a composition can be dynamic in its use and operation, this disclosure is intended to encompass the equivalents, means, systems and methods of the use of the composition and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A composition comprising:
   magnetic particles having a median particle size ranging from about 10 to about 30 microns, the magnetic particles including a reflector layer, a dielectric layer that is external to the reflector layer, and an absorber layer that is external to the dielectric layer; and
   reflective particles having magnetic properties and a median particle size ranging from about 1 micron to 5.5 microns;
   wherein the reflective particles have a lightness at least 10 points higher than the lightness of the magnetic particles,
   wherein the magnetic particles and the reflective particles are pigments in the form of flakes; and
   wherein the reflective particles include a reflector layer, a magnetic layer, and a dielectric layer.

2. The composition of claim 1, wherein the reflector layer of the magnetic particles has a high reflectance and is the magnetic layer of the magnetic particles.

3. The composition of claim 1, wherein the magnetic particles further include a magnetic layer that is different than the reflector layer.

4. The composition of claim 1, wherein the magnetic particles include a colored material.

5. The composition of claim 1, wherein the reflector layer of the reflective particles is the magnetic layer of the reflective particles.

6. The composition of claim 1, wherein the reflector layer of the reflective particles is different than the magnetic layer of the reflective particles.

7. The composition of claim 1, wherein the reflector layer of the reflective particles has a high reflectance and is the magnetic layer of the reflective particles.

8. The composition of claim 1, wherein the reflective particles further include an absorber layer.

9. The composition of claim 1, further comprising a liquid medium.

10. The composition of claim 1, wherein the reflective particles are present in the composition in an amount from about 1 to about 40 area percent, based upon the combined particle surface of the magnetic particles and the reflective particles.

11. The composition of claim 1, wherein the magnetic particles are present in the composition in an amount from about 1 wt. % to about 35 wt. %, based upon the total weight percent of the composition.

12. The composition of claim 1, wherein the magnetic particles have a median particle size ranging from 13 microns to about 20 microns.

13. The composition of claim 1, wherein the composition is in the form of an ink, a coating, a varnish, a paint, or a colorant.

14. The composition of claim 1, wherein the reflective particles do not include an absorber layer external to the dielectric layer.

15. A method of making a composition, comprising:

providing magnetic particles having a median particle size ranging from about 10 to about 30 microns, the magnetic particles including a reflector layer, a dielectric layer that is external to the reflector layer, and an absorber layer that is external to the dielectric layer;

providing reflective particles having magnetic properties and a median particle size ranging from about 1 micron to 5.5 microns; and blending, in a liquid medium, the magnetic particles with the reflective particles to form a composition wherein the reflective particles have a lightness at least 10 points higher than the lightness of the magnetic particles, wherein the magnetic particles and the reflective particles are pigments in the form of flakes; and wherein the reflective particles include a reflector layer, a magnetic layer, and a dielectric layer.

16. The method of claim 15, wherein the reflective layer of the reflective particles has a high reflectance and magnetic properties.

17. The method of claim 15, wherein the reflective particles further include an absorber layer.

18. The method of claim 15, wherein the reflector layer of the reflective particles is the magnetic layer of the reflective particles.

19. The method of claim 15, wherein the reflector layer of the reflective particles is different than the magnetic layer of the reflective particles.

20. The method of claim 15, wherein the reflective particles do not include an absorber layer external to the dielectric layer.

* * * * *